United States Patent
Ichimaru

(10) Patent No.: US 6,554,597 B1
(45) Date of Patent: Apr. 29, 2003

(54) TIRE VULCANIZING MACHINE

(75) Inventor: Hironobu Ichimaru, Chikugo (JP)

(73) Assignee: Ichimaru Giken Co., Ltd., Chikugo (JP)

( * ) Notice: Subject to any disclaimer, the term of this patent is extended or adjusted under 35 U.S.C. 154(b) by 0 days.

(21) Appl. No.: 09/857,011

(22) PCT Filed: Nov. 4, 1999

(86) PCT No.: PCT/JP99/06156

§ 371 (c)(1),
(2), (4) Date: May 29, 2001

(87) PCT Pub. No.: WO00/32373

PCT Pub. Date: Jun. 8, 2000

(30) Foreign Application Priority Data

Nov. 30, 1998 (JP) .......................................... 10-338893

(51) Int. Cl.⁷ ............................................... B29C 35/02
(52) U.S. Cl. ......................................... 425/38; 425/58.1
(58) Field of Search ................................... 425/38, 58.1

(56) References Cited

U.S. PATENT DOCUMENTS

| 3,988,077 A | | 10/1976 | Naratov et al. | |
| 4,025,251 A | * | 5/1977 | Cantarutti | 425/38 |
| 4,131,402 A | * | 12/1978 | Pirovano | 425/38 |

* cited by examiner

*Primary Examiner*—James P. Mackey
(74) *Attorney, Agent, or Firm*—Flynn, Thiel, Boutell & Tanis, P.C.

(57) ABSTRACT

A tire vulcanizing machine has a tire receiving position, tire supplying position, tire vulcanizing position, and tire removing position. A receiving table receives a green tire and provides the tire to a tire supplying device. The tire supplying device positions the tire on a lower die and an upper die closes. The dies vulcanize and mold the green tire therebetween. A removing device transfers the vulcanized tire to a cooling device and ejects the cooled tire to a transfer conveyor. The receiving table, lower die and removing device are joined to each other and make a reciprocating movement at the same time at their set positions along with a transfer unit.

1 Claim, 5 Drawing Sheets

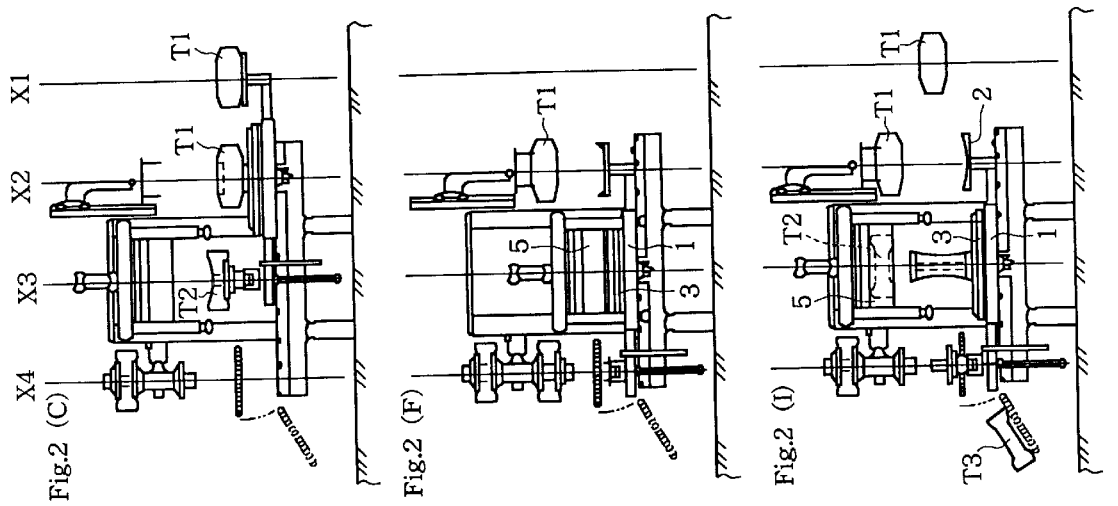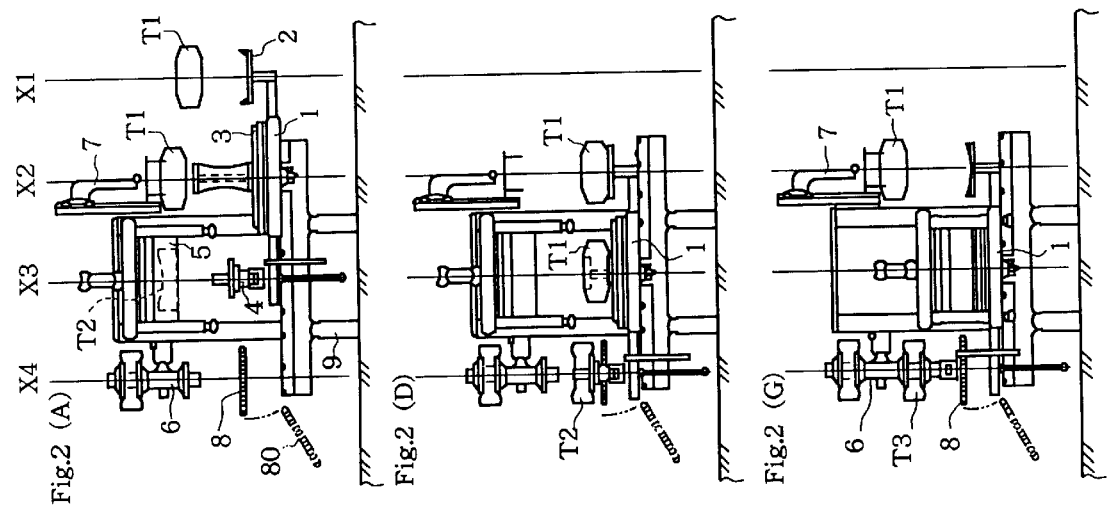

TIRE VULCANIZING MACHINE

FIELD OF THE INVENTION

The present invention relates to a tire vulcanizing machine to continuously vulcanize and mold green tires.

BACKGROUND OF THE INVENTION

Conventional tire vulcanizing machines to vulcanize and mold the green tire continuously comprise a receiving table to receive green tires, a die to vulcanize and mold the green tires, a tire supplying device to set green tires on the die and a removing device to send out the tires to the transfer conveyor after vulcanization.

The green tires transferred to the receiving table are molded by being set to the die by the tire supplying device, vulcanized and molded by the die, then, transferred to the transfer conveyor by the removing device.

However, in the conventional tire vulcanizing machine, among the above shown processes, the action that the green tires are set on the die by the tire supplying device and the action that the tires are removed from the die after vulcanization cannot be executed simultaneously. In other words, there occurs waste of time when no vulcanization and molding are executed.

The purpose of the present invention is to dissolve the conventional problems shown above. In the present invention, separate processes can be performed for multiple green tires and tires after vulcanization simultaneously in the tire vulcanizing machine. For example, the present invention aims to offer a tire vulcanizing machine to enhance operation efficiency as a continuous work significantly by enabling the action where green tires are received from the receiving table by the tire supplying device and at the same time, the molded tires after vulcanization are set on the cooling device by the ejecting device.

SUMMARY OF THE INVENTION

A tire vulcanizing machine of the present invention comprises:
  a receiving table to receive green tires at the tire receiving position;
  a tire supplying device which receives a green tire from the receiving table by rising/falling at the tire receiving position and sets the green tire on the lower die at the tire supplying and vulcanizing position;
  an upper die which vulcanizes and molds the green tire between itself and the lower die by rising/falling at the tire supplying and vulcanizing position and transfers the tire after vulcanization to the tire removing position;
  a removing device which receives the green tire after vulcanization from the upper die by rising/falling at the tire removing position and then, ejects the tire after vulgarization to the transfer conveyor;
  a transfer unit wherein the said tire supplying device and the upper die are connected to each other;
  a transfer device which makes the tire supplying device and the upper die move between their mutual positions by the reciprocating movement of the transfer unit.

According to the present invention, the tire supplying device moves between the tire receiving position and the tire supplying/vulcanizing position and the upper die moves between the tire supplying/vulcanizing position and the tire removing position by the reciprocating movement of the transfer unit by the transfer device.

As shown above, the three positions such as the tire receiving position, the tire supplying/vulcanizing position and the tire removing position were set, then, each tire moves to the next position by a single reciprocating motion of the transfer unit, and the next process is executed at the position where each tire is transferred.

So, separate processes for multiple (three) green tires and vulcanized tires can be performed enhancing operation efficiency as a continuous work significantly.

The tire vulcanizing machine of the present invention also comprises:
  a receiving table to receive a green tire at the tire receiving position and to transfer the received green tire to the supplying position;
  a tire supplying device which receives a green tire on the receiving table by rising/falling at the tire supplying position and sets the green tire on the lower die;
  an upper die which vulcanizes and molds the green tire between itself and the lower die by rising/falling at the tire vulcanizing position;
  a removing device which receives the green tire after vulcanization from the upper die by rising/falling at the tire vulcanizing position and sets the tire after vulgarization to the pressurizing and cooling device by rising/falling at the tire removing position and ejects the tire after cooling to the transfer conveyor;
  a transfer unit wherein the said receiving table, the lower die and the removing device are connected to one another;
  a transfer device wherein receiving table, the lower die and the removing device make a reciprocating movement among their mutual positions simultaneously by the reciprocating movement of the transfer unit.

According to the present invention, the tire receiving device makes a reciprocating movement between the tire receiving position and the tire supplying position, the lower die makes a reciprocating movement between the tire supplying position and the tire vulcanizing position, and the removing device makes a reciprocating movement between the tire vulcanizing position and the tire removing position by the reciprocating movement of the transfer unit by the transfer device.

As shown above, the four positions such as the tire receiving position, the tire supplying position, vulcanizing position and the tire removing position are set, and each tire moves to the next position by a single reciprocating movement of the transfer unit, and the next process is executed at the position where each tires is transferred.

The tire vulcanizing machine of the present invention also comprises:
  a left and a right receiving table which receive the green tire at the both left and right tire receiving position;
  a left and a right tire supplying device which receive the green tire from each receiving table by rising/falling at the tire receiving position, and set the green tire on the lower die respectively at the tire supplying/vulcanizing position;
  a left and a right upper die which vulcanize and mold the green tire between itself and the lower die by rising/falling at the tire supplying/vulcanizing position and transfer the vulcanized green tire to the tire removing position;
  a removing device which receives the green tire after vulcanization from each upper die by rising/falling at the tire removing position and sets the tire after vulgarization to the transfer conveyor;

a left transfer unit wherein the said left tire supplying device and the left upper die are connected to each other;

a right transfer unit wherein the said right tire supplying device and the right upper die are connected maintaining the said arrangement distance; and a left and a right transfer device wherein the receiving table, the lower die and the removing device make a reciprocating movement among their mutual positions by the reciprocating movement of the left and right transfer unit.

According to the present invention, the tire supplying/vulcanizing position and tire receiving position are set at both sides of the tire removing position as the center and the two transfer units (right/left) are equipped. The left tire supplying device makes a reciprocating movement between the left tire receiving position and the left tire supplying/vulcanizing position and the left upper die makes a reciprocating movement between the left tire supplying/vulcanizing position and the central tire removing position by the reciprocating movement of the left transfer unit. The right tire supplying device makes a reciprocating movement between the right tire receiving position and the right tire supplying/vulcanizing position and the right upper die makes a reciprocating movement between the right tire supplying/vulcanizing position and the central tire removing position by the reciprocating movement of the right transfer unit.

As shown above, the three positions such as the tire receiving position, the tire supplying/vulcanizing position and the tire removing position are set for the left and the right transfer unit respectively and the left and the right transfer unit share the central tire removing position. So, the whole machine can be configured in a smaller size in spite that it is equipped with the tire vulcanizing devices equivalent to two machines.

The tire vulcanizing machine of the present invention also comprises:

a left and a right receiving table which receive the green tire at the left and the right tire receiving position;

a left and a right tire supplying device which receive the green tire from each receiving table by rising/falling at the tire receiving position and set the green tire on the lower die respectively at the tire supplying/vulcanizing position;

a left and a right upper die which vulcanize and mold the green tire between itself and the lower die by rising/falling at the tire supplying/vulcanizing position and transfer the vulcanized tire to the tire removing position respectively;

a removing device which receives the green tire after vulcanization from each upper die by rising/falling at the tire removing position and ejects the tire after vulgarization to the transfer conveyor;

a left side transfer unit wherein the said left tire supplying device and the left upper die are connected to each other;

a right side transfer unit wherein the said right side tire supplying device and the right upper die are connected maintaining the said arrangement distance;

a transfer device wherein the receiving table, the lower die and the removing device make a reciprocating movement between their positions by each reciprocating movement of the left and the right transfer unit and the transfer device is equipped on the left and right transfer unit detachably.

The three positions such as the tire receiving position, the tire supplying/vulcanizing position and the tire removing position are set for the left and the right transfer unit respectively and the left and the right transfer unit share the central tire removing position. So, the whole machine can be configured in a smaller size space despite being equipped with tire vulcanizing devices equivalent to two machines.

In addition to that, a transfer machine to make the left and the right transfer unit make a reciprocating movement is equipped detachably on the left and the right transfer unit. So, the whole machine can be configured in a smaller size and the number of the components can be reduced as the left and right transfer unit make a reciprocating movement sharing a single transfer device.

BRIEF DESCRIPTION OF THE DRAWINGS

FIG. 2: A schematic diagram of the operation of the tire vulcanizing machine.

DETAILED DESCRIPTION OF THE INVENTION

Figure 1:
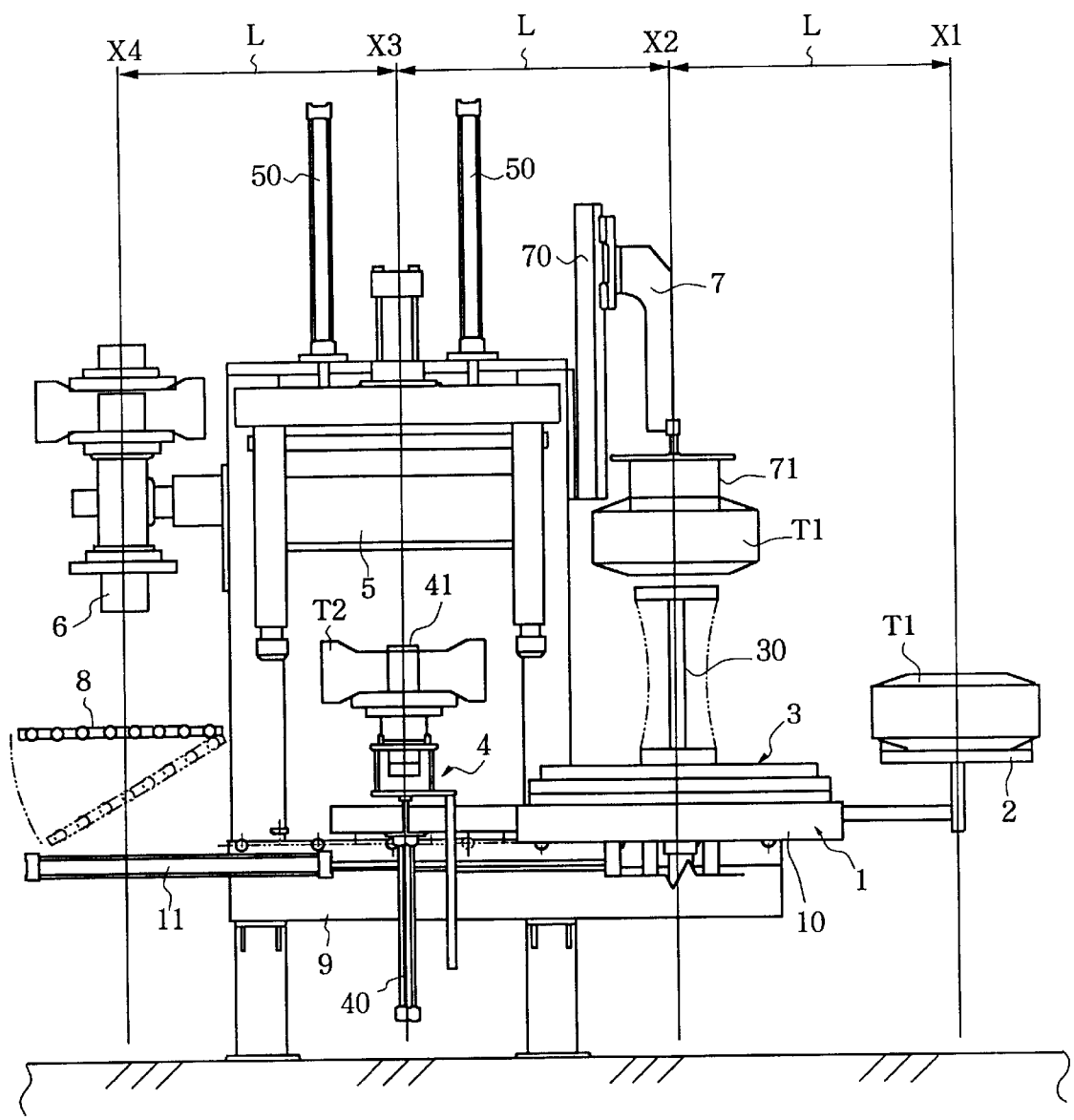
FIG. 1: An elevational view of the first embodiment of the tire vulcanizing machine according to the present invention.

Embodiments of the present invention will be described in figures hereinafter. FIG. 1 is an elevational view of the first embodiment of the tire vulcanizing machine of the present invention. FIG. 2 is a schematic diagram of the operation of the tire vulcanizing machine.

In this tire vulcanizing machine, the four positions such as the tire receiving position X1, the tire supplying position X2, the tire vulcanizing position X3 and the tire removing position X4 are set orderly with the same arrangement distance L respectively.

In the figure, the transfer unit 1 is composed of the receiving table 2, the lower die 3 and the removing device 4 are connected to one another via the carriage 10. The said arrangement distance L is maintained between the receiving table 2 and the lower die 3, and the lower die 3 and the removing device 4 respectively.

The said carriage 10 is supported movably on the machine frame 9 in a horizontal position and makes a reciprocating movement by the transfer device 11 with a hydraulic cylinder. The tire receiving table 2 makes a reciprocating movement between the tire receiving position X1 and the tire supplying position X2 and the lower die 3 makes a reciprocating movement between the tire supplying position X2 and the tire vulcanizing position X3, the removing device 4 makes a reciprocating movement between the tire vulcanizing position X3 and the tire removing position X4 by the reciprocating movement of the carriage 10.

The said receiving table 2 receives the green tire T1 at the tire receiving position X1 and transfers the received green tire T1 to the tire supplying position X2.

The lower die 3 vulcanizes and molds the green tire T1 between itself and the upper die 5 described below, at the center of which a positioning device (centering mechanism) 30 for the green tire T1 is equipped enabled to rise/fall.

The removing device 4 is supported enabled to rise and fall by the hydraulic cylinder 40 and equipped with a drawspan 41 at the upper end, rises at the tire vulcanizing position X3 to receive the vulcanized tire T2 from the upper die 5 and then falls. After the vulcanization of the tire, it rises at the tire removing position X4 to set the tire T2 to the pressurizing and cooling device 6, then falls, and it ejects the cooled tire T3 to the transfer conveyor 8.

A tire supplying device 7 supported enabled to rise and fall by the elevator (not shown) on the rail 70 equipped on the machine frame 9 is equipped on the tire supplying position X2. Drawspan 71 is equipped at the lower end of the tire supplying device 7. The tire supplying device 7 receives the green tire T1 on the receiving table 2 at the bottom position. After that, it rises and then falls to set the green tire T1 to the lower die 3.

The upper die 5 supported enabled to rise and fall by the hydraulic cylinder 50 at the machine frame 9 is equipped at the tire vulcanizing position X3. The upper die 5 vulcanizes and molds the green tire T1 between itself and the lower die 3, after that, rises with the vulcanized tire T2 being held.

The said pressurizing and cooling device 6 is equipped on the tire removing position X4 which pressurizes and cools the vulcanized tire T2 to stabilize it to the product shape.

The said transfer conveyor 8 is equipped on the tire removing position X4 and receives the cooled tire T3 removed from the said pressurizing and cooling device 6 by the removing device 4 and transfers the cooled tire T3 to the transfer conveyor 80.

In this the tire vulcanizing machine, when the green tire T1 is supplied to the receiving table 2 at the tire receiving position X1 (FIG. 2–B), the green tire T1 moves to the tire supplying position X2 by the movement of the transfer unit 1 (FIG. 2–D) and is received by the tire supplying device 7 (FIG. 2–E) and waits at the elevated position (FIGS. 2–F–A). At the tire vulcanizing position X3, the green tire T1 which has already been supplied, is vulcanized and molded by the upper die 5 and the lower die 3. At the tire removing position X4, the vulcanized tire T2 is set to the pressurizing and cooling device 6 by the removing device 4 and pressurized and cooled. The cooled tire T3 is ejected on the transfer conveyor 8 by the removing device 4 and subsequently transferred to the transfer conveyor 80.

The green tire T1 waiting at the top position by the tire supplying device 7 as described above, is set on the lower die 3 by the fall of the tire supplying device 7 when the lower die 3 moves to the tire supplying position 2 by the movement of the transfer unit 1 (FIG. 2–B). At this time, the next green tire T1 is supplied to the receiving table 2 at the tire receiving position X1.

Then, the green tire T1 set on the lower die 3 moves to the tire vulcanizing position X3 by the movement of the transfer unit 1 (FIG. 2–D). Then, it is vulcanized and molded against the upper die 5 (FIG. 2E–H). After that, it is removed from the upper die 5 at the tire vulcanizing position X3 by the removing device 4 (FIGS. 2–B–C). Then, vulcanized tire T2 moves to the tire removing position X4 by the movement of the transfer unit 1 (FIG. 2–D). Here, it is pressurized and cooled by the pressurizing and cooling device 6 (FIG. 2–F) and then, is ejected to the transfer conveyor 8 (FIG. 2–H).

As shown above, the tire receiving table 2 makes a reciprocating movement between the tire receiving position X1 and the tire supplying position X2, the lower die 3 makes a reciprocating movement between the tire supplying position X2 and the tire vulcanizing position X3, and the removing device 4 makes a reciprocating movement between the tire vulcanizing position X3 and the tire removing position X4 by the reciprocating movement of the transfer unit 1 by the transfer device 11.

As shown above, the four positions such as the tire receiving position X1, the tire supplying position X2, the tire vulcanizing position X3 and the tire removing position X4 are set. Tire T1 and T2 move to the next position sequentially by a single reciprocating movement of the transfer unit 1 and are performed with the next process at each positions where they moved. For example, vulcanization and molding are performed at the tire vulcanizing position X3 while the green tire T1 is received by the tire supplying device 7 at the tire supplying position X2 or the molded and vulcanized tire T2 is set on the pressurizing and cooling device 6 by the removing device 4. So, operation efficiency as a continuous work can be enhanced significantly.

Figure 3:
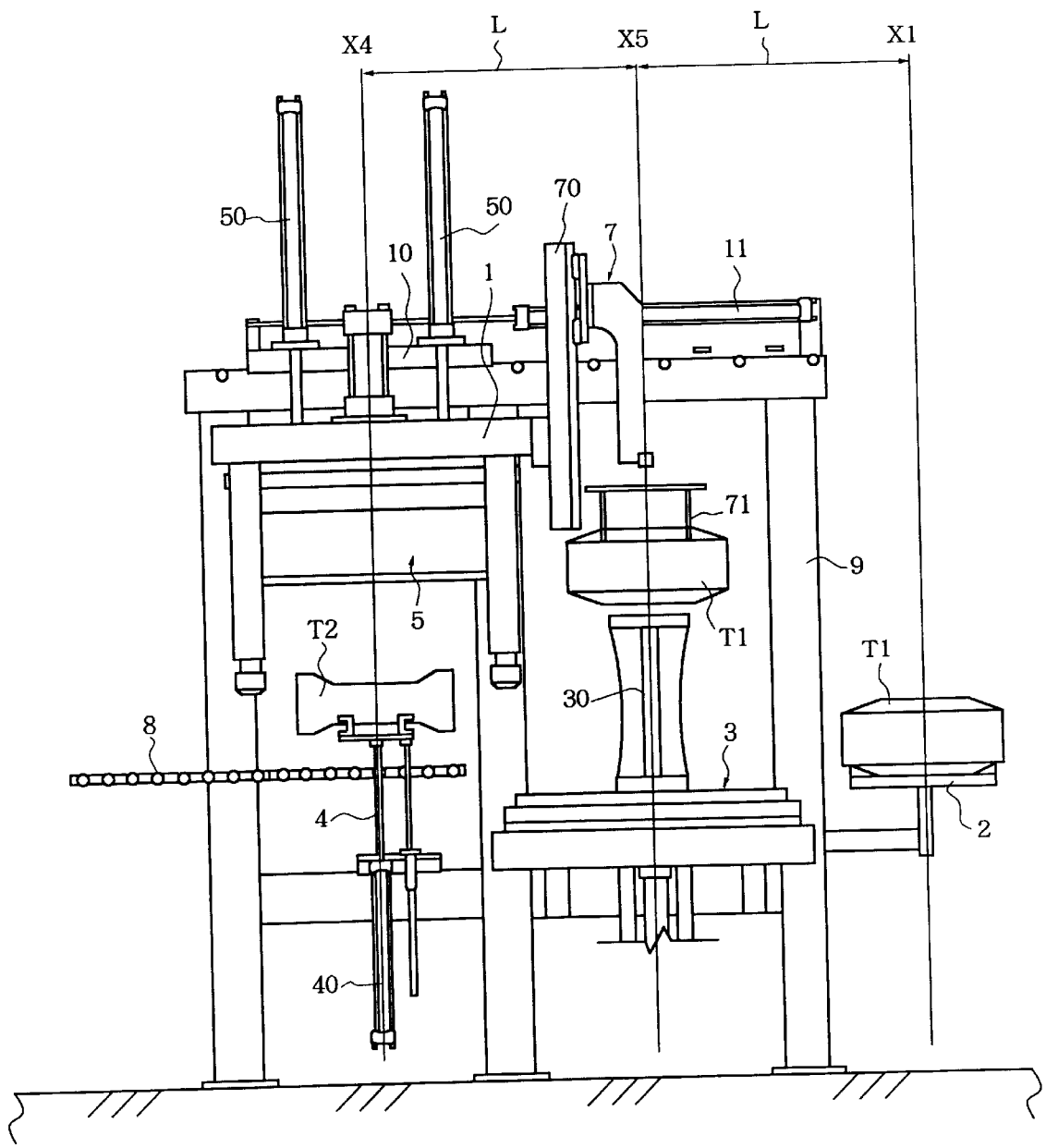
FIG. 3: An elevational view of the second embodiment of the tire vulcanizing machine according to the present invention.

FIG. 3 is an elevational view of the tire vulcanizing machine of a second embodiment of the present invention.

In this tire vulcanizing machine, the three positions such as the tire receiving position X1, the tire supplying and vulcanizing position X5 and the tire removing position X4 are set orderly with the same arrangement distance L. The transfer unit 1 wherein the tire supplying device 7 and the upper die 5 are connected to each other maintaining the said arrangement distance L is formed. A transfer device to make the tire supplying device 7 and the upper die 5 make a reciprocating movement between their mutual positions by the reciprocating movement of the transfer unit 1 is equipped.

In the tire vulcanizing machine, the tire supplying position X2 shown in the first embodiment and the tire vulcanizing position X3 are set to the same position as the tire supplying and vulcanizing position X5 and the cooling device 6 is not equipped at the removing position X4.

In the tire vulcanizing machine, the tire supplying device 7 makes a reciprocating movement between the tire receiving position X1 and tire supplying and vulcanizing position X5 and the upper die 5 makes a reciprocating movement between the tire supplying and vulcanizing position X5 and the tire removing position X4 by the reciprocating movement of the transfer unit 1 by the transfer device 11.

As shown above, the three positions such as the tire receiving position X1, the tire supplying/vulcanizing position X5 and the tire removing position X4 are set, and the tire T1 and T2 move to the next position sequentially by the a single reciprocating movement of the transfer unit 1 and are performed with the next process at each position to which they moved as the first embodiment shown above.

Figure 4:
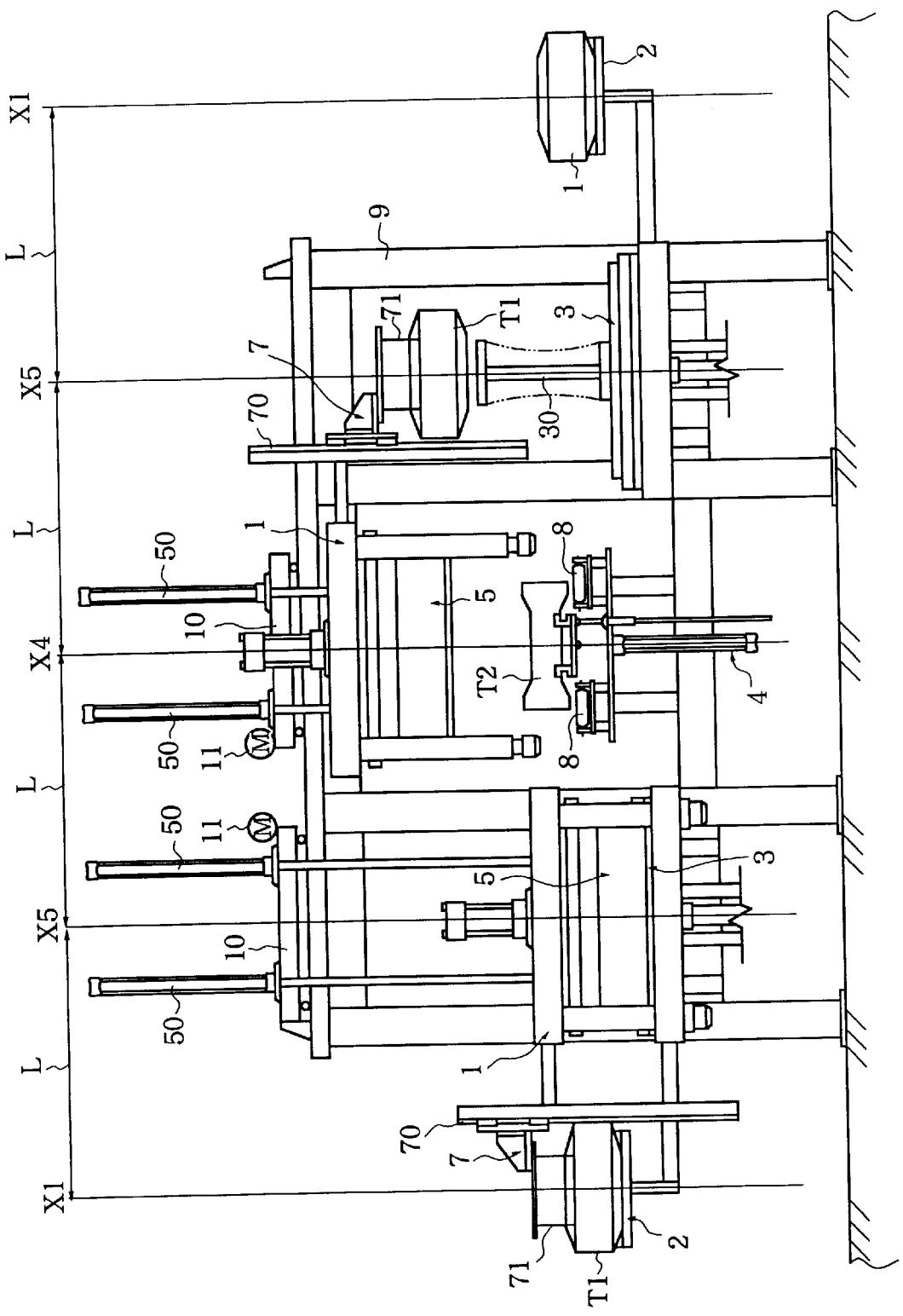
FIG. 4: An elevational view of the third embodiment of the tire vulcanizing machine according to the present invention.

FIG. 4 is an elevational view of a third embodiment of the tire vulcanizing machine.

In this tire vulcanizing machine, the central tire removing position X4 and the tire supplying and vulcanizing position X5, X5 which are allocated at the left and right side of the tire removing position X4, and the tire receiving position X1, X1 which are allocated at the left and right of the both tire supplying and vulcanizing position X5, X5 are arranged with the same arrangement distance L. The receiving table 2, 2, the tire supplying device 7, 7, the lower die 3, 3, and the upper die 5, 5 are equipped for both left and right side. A removing device 4 which ejects the vulcanized tire T2 to the transfer conveyor 8 is equipped at the tire removing position X4.

In this tire vulcanizing machine, the tire supplying and vulcanizing position X5 and the tire receiving position X1 and the two (left/right) transfer unit 1, 1 are allocated on the left/right side of the tire removing position X4, respectively. The tire supplying device 7 makes a reciprocating movement between the left tire receiving position X1 and the left tire supplying and vulcanizing position X5, and the left upper die 5 makes a reciprocating movement between the left tire supplying and vulcanizing position X5 and the central tire removing position X4 by the reciprocating movement of the left transfer unit 1. The action of the right tire supplying device and the right upper die accompanying the reciprocating movement of the right transfer unit 1 is the same as this.

As shown above, the three positions such as the tire receiving position X1, the tire supplying/vulcanizing position X5 and the tire removing position X4 are set for left and right transfer unit 1, 1 respectively and the left and the right transfer unit 1, 1 share the central tire removing position X4. So, the whole machine can be configured in a smaller size in spite that it is equipped with the tire vulcanizing devices equivalent to two machines.

Figure 5:
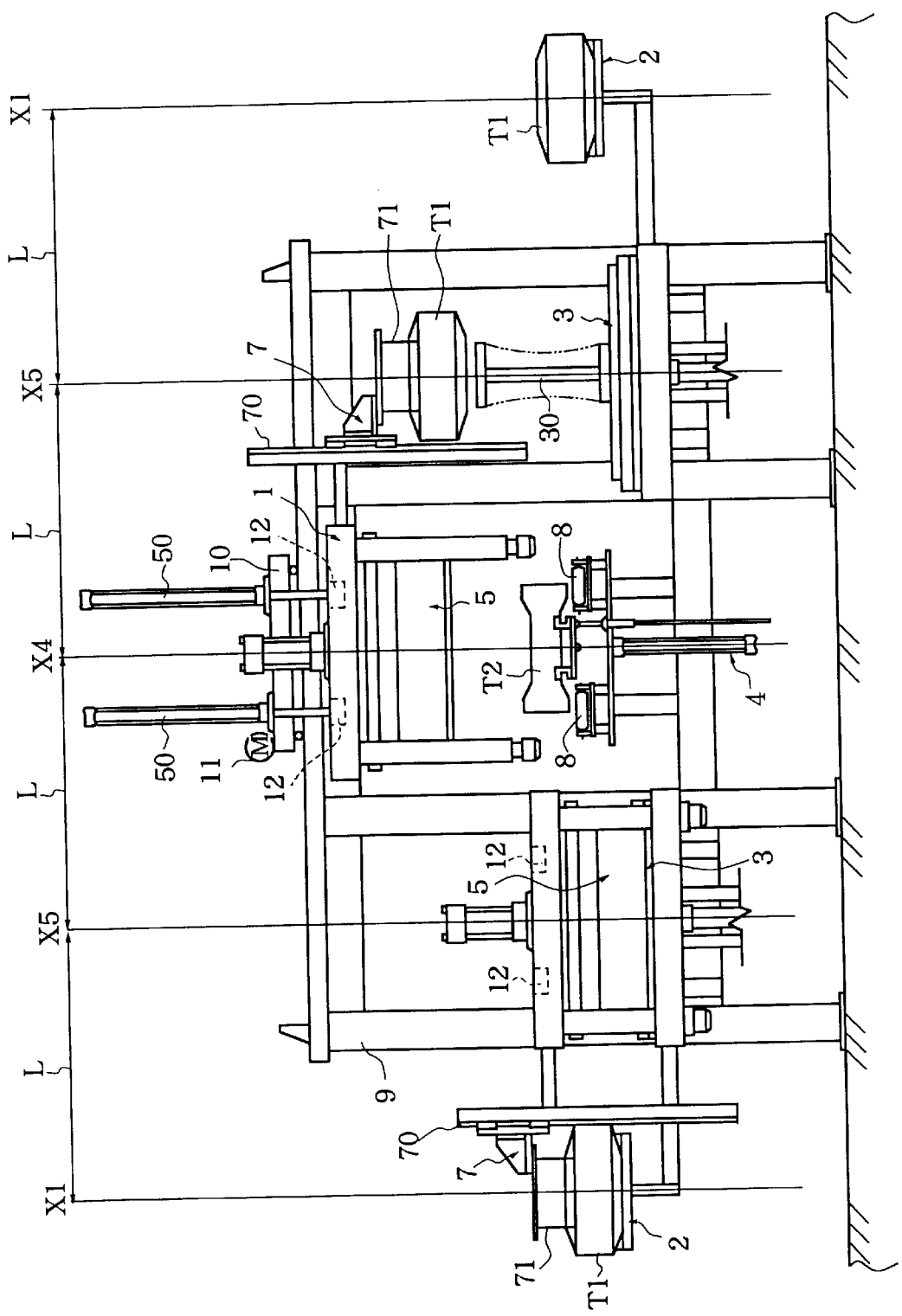
FIG. 5: An elevational view of the fourth embodiment of the tire vulcanizing machine according to the present invention.

FIG. 5 is an elevational view of a fourth embodiment of the tire vulcanizing machine of the present invention.

The tire vulcanizing machine, especially in the third embodiment of the tire vulcanizing machine shown above, is featured by a transfer device 11 equipped wherein the receiving table 2, the lower die 3 and the removing device 4 make a reciprocating movement among their mutual positions by the reciprocating movement of the left and the right transfer unit 1, 1 and the transfer device 11 installed detachably to the left, and the right transfer unit 1, 1 by the coupling mechanism 12, 12.

So, the whole body can be configured in a smaller size and the number of the component parts can be reduced as the left and the right transfer unit 1, 1 make a reciprocating movement sharing a single transfer device 1, 1.

As described above, as this tire vulcanizing machine according to the present invention is configured as shown above, separate processes can be executed on the multiple green tires or vulcanized tires simultaneously, e.g. the green tire is received from the receiving table by the tire supplying device while vulcanizing and molding are performed on the die, or the vulcanized tire which has been molded is set to the cooling device by the removing device. Thus, operation efficiency as a continuous work can be enhanced significantly.

In addition to that, idle time during when no vulcanization and molding are performed will not be generated as the action that the green tire is set to the die by the tire supplying device and the action that the vulcanized tire is removed from the die by the removing device can be performed simultaneously.

In the tire vulcanizing machine of the present invention, the whole machine can be configured in a smaller space despite being equipped with tire vulcanizing devices equivalent to two machines as the central tire removing position is shared.

In the tire vulcanizing machine of the present invention, the whole body can be configured in a smaller size and the number of component parts can be reduced as the left and right transfer unit make a reciprocating movement to share a single transfer device.

What is claimed:

1. A tire vulcanizing machine comprising:

a receiving table to receive a green tire at a tire receiving position and to transfer the received green tire to a tire supplying position;

a tire supplying device which receives the green tire from the receiving table by rising/falling at the tire supplying position and locates the green tire on a lower die;

an upper die which, in combination with the lower die, vulcanizes and molds the green tire therebetween by rising/falling at a tire vulcanizing position;

a removing device which receives the green tire after vulcanization from the upper die by rising/falling at the tire vulcanizing position, which transfers the tire after vulcanization to a pressurizing and cooling device by rising/falling at a tire removing position and which ejects the tire after cooling to a transfer conveyor;

a transfer unit wherein the receiving table, the lower die and the removing device are connected to one another; and a transfer device which operates so that the receiving table, the lower die and the removing device make a reciprocating movement at a same time among mutual positions in response to the reciprocating movement of the transfer unit.

* * * * *